(12) United States Patent
Jones et al.

(10) Patent No.: US 7,392,479 B2
(45) Date of Patent: Jun. 24, 2008

(54) SYSTEM AND METHOD FOR PROVIDING NAMESPACE RELATED INFORMATION

(75) Inventors: Brian Michael Jones, Redmond, WA (US); Marcin Sawicki, Kirkland, WA (US); Robert Andrew Little, Redmond, WA (US); Paul Alexander Broman, Renton, WA (US); Jeffrey C. Reynar, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 10/184,190

(22) Filed: Jun. 27, 2002

(65) Prior Publication Data

US 2004/0002937 A1    Jan. 1, 2004

(51) Int. Cl.
*G06F 17/00* (2006.01)
(52) U.S. Cl. .................. 715/513; 715/522; 715/526
(58) Field of Classification Search ............. 715/500, 715/501.1, 513, 522, 526, 500.1
See application file for complete search history.

(56) References Cited

U.S. PATENT DOCUMENTS

| | | | |
|---|---|---|---|
| 4,674,065 A | 6/1987 | Lange et al. ............. 382/311 |
| 4,868,750 A | 9/1989 | Kucera et al. ............ 711/2 |
| 5,020,019 A | 5/1991 | Ogawa .................. 707/5 |
| 5,128,865 A | 7/1992 | Sadler .................. 704/2 |
| 5,159,552 A | 10/1992 | van Gasteren et al. ....... 704/1 |
| 5,267,155 A | 11/1993 | Buchanan et al. ......... 715/540 |
| 5,297,039 A | 3/1994 | Kanaegami et al. ........ 707/5 |
| 5,317,546 A | 5/1994 | Balch et al. ............. 368/9 |
| 5,337,233 A | 8/1994 | Hofert et al. ............ 715/540 |
| 5,341,293 A | 8/1994 | Vertelney et al. ......... 715/530 |
| 5,351,190 A | 9/1994 | Kondo .................. 704/8 |
| 5,386,564 A | 1/1995 | Shearer et al. ........... 395/650 |
| 5,392,386 A | 2/1995 | Chalas ................. 715/841 |
| 5,418,902 A | 5/1995 | West et al. ............. 715/503 |
| 5,446,891 A | 8/1995 | Kaplan et al. ........... 395/600 |
| 5,541,836 A | 7/1996 | Church et al. ........... 704/7 |
| 5,596,700 A | 1/1997 | Darnell et al. .......... 715/512 |
| 5,617,565 A | 4/1997 | Augenbraun et al. ...... 395/604 |
| 5,625,783 A | 4/1997 | Ezekiel et al. .......... 395/352 |
| 5,627,958 A | 5/1997 | Potts et al. ............ 715/708 |
| 5,634,019 A | 5/1997 | Koppolu et al. ......... 715/744 |

(Continued)

FOREIGN PATENT DOCUMENTS

EP    0 364 180 A2    4/1990

(Continued)

OTHER PUBLICATIONS

U.S. Appl. No. 10/731,899, filed Dec. 9, 2003, Jones et al.

(Continued)

*Primary Examiner*—Stephen Hong
*Assistant Examiner*—Gregory J. Vaughn
(74) *Attorney, Agent, or Firm*—Merchant & Gould (57) ABSTRACT

A system and method for providing namespace related information. A namespace library operating in a computer provides a central source of namespace related information for handling XML documents. The namespace related information may be used by other computer application programs operating in the computer. The namespace related information provided by the namespace library is indexed by namespace. Many types of namespace related information may be associated with each namespace. The computer application programs may obtain namespace related information by querying the namespace library using a particular namespace.

17 Claims, 7 Drawing Sheets

U.S. PATENT DOCUMENTS

| | | | |
|---|---|---|---|
| 5,640,560 A | 6/1997 | Smith | 395/615 |
| 5,657,259 A | 8/1997 | Davis et al. | 708/204 |
| 5,685,000 A | 11/1997 | Cox | 704/9 |
| 5,708,825 A | 1/1998 | Sotomayor | 395/762 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,826,025 A | 10/1998 | Gramlich | 395/200.47 |
| 5,845,077 A | 12/1998 | Fawcett | 709/221 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,892,919 A | 4/1999 | Nielsen | 395/200.58 |
| 5,893,073 A | 4/1999 | Kasso et al. | 705/8 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,498 A | 8/1999 | Schneck et al. | 705/54 |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,987,480 A | 11/1999 | Donohue et al. | 715/501.1 |
| 5,991,719 A | 11/1999 | Yazaki et al. | 704/251 |
| 5,995,756 A | 11/1999 | Herrmann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A | 2/2000 | Conrad et al. | 345/840 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,085,201 A | 7/2000 | Tso | 715/505 |
| 6,088,711 A | 7/2000 | Fein et al. | 715/523 |
| 6,092,074 A | 7/2000 | Rodkin et al. | 707/102 |
| 6,108,640 A | 8/2000 | Slotznick | 705/26 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,177 B1 | 10/2001 | Dauerer et al. | 707/2 |
| 6,311,194 B1 | 10/2001 | Sheth et al. | 715/505 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 | 1/2002 | Fields et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,516,321 B1 | 2/2003 | De La Huerga | 707/102 |
| 6,519,557 B1 | 2/2003 | Emens et al. | 704/8 |
| 6,519,603 B1 | 2/2003 | Bays et al. | 707/102 |
| 6,546,433 B1 | 4/2003 | Matheson | 709/318 |
| 6,553,385 B2 | 4/2003 | Johnson et al. | 707/104.1 |
| 6,556,972 B1 | 4/2003 | Bakis et al. | 704/277 |
| 6,556,984 B1 | 4/2003 | Zien | 707/2 |
| 6,564,264 B1 | 5/2003 | Creswell et al. | 709/245 |
| 6,571,241 B1 | 5/2003 | Nosohara | 707/6 |
| 6,571,253 B1 | 5/2003 | Thompson et al. | 707/103 R |
| 6,601,075 B1 | 7/2003 | Huang et al. | 707/104.1 |
| 6,615,131 B1 | 9/2003 | Rennard et al. | 701/200 |
| 6,618,733 B1 | 9/2003 | White et al. | 707/103 |
| 6,622,140 B1 | 9/2003 | Kantrowitz | 707/5 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,654,932 B1 | 11/2003 | Bahrs et al. | 715/507 |
| 6,658,623 B1 | 12/2003 | Schilit et al. | 715/513 |
| 6,687,485 B2 | 2/2004 | Hopkins et al. | 434/350 |
| 6,694,307 B2 | 2/2004 | Julien | 707/3 |
| 6,697,824 B1 | 2/2004 | Bowman-Amuah | 709/229 |
| 6,697,837 B1 | 2/2004 | Rodov | 709/203 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,741,994 B1 | 5/2004 | Kang et al. | 707/102 |
| 6,742,054 B1 | 5/2004 | Upton, IV | 710/6 |
| 6,745,208 B2 | 6/2004 | Berg et al. | 707/201 |
| 6,795,808 B1 | 9/2004 | Strubbe et al. | 704/275 |
| 6,802,061 B1 | 10/2004 | Parthasarathy et al. | 717/173 |
| 6,826,726 B2 | 11/2004 | Hsing et al. | 715/513 |

| | | | |
|---|---|---|---|
| 6,868,525 B1 | 3/2005 | Szabo | 715/738 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,925,457 B2* | 8/2005 | Britton et al. | 707/1 |
| 6,925,470 B1* | 8/2005 | Sangudi et al. | 707/102 |
| 6,944,857 B1 | 9/2005 | Glaser et al. | 717/173 |
| 6,948,133 B2 | 9/2005 | Haley | 715/780 |
| 6,950,831 B2 | 9/2005 | Haley | 707/104.1 |
| 6,950,982 B1 | 9/2005 | Dourish | 715/512 |
| 6,957,385 B2 | 10/2005 | Chan et al. | 715/504 |
| 6,964,010 B1 | 11/2005 | Sharp | 715/507 |
| 6,976,090 B2 | 12/2005 | Ben-Shaul et al. | 709/246 |
| 6,976,209 B1 | 12/2005 | Storisteanu et al. | 715/512 |
| 6,986,104 B2 | 1/2006 | Green et al. | 715/523 |
| 6,990,654 B2 | 1/2006 | Carroll, Jr. | 717/109 |
| 7,013,289 B2 | 3/2006 | Horn et al. | 705/26 |
| 7,051,076 B2 | 5/2006 | Tsuchiya | 709/206 |
| 7,082,392 B1 | 7/2006 | Butler et al. | 704/233 |
| 7,113,976 B2 | 9/2006 | Watanabe | 709/206 |
| 7,216,351 B1 | 5/2007 | Maes | 719/328 |
| 2001/0029605 A1 | 10/2001 | Forbes et al. | 717/11 |
| 2001/0041328 A1 | 11/2001 | Fisher | 434/157 |
| 2001/0056461 A1* | 12/2001 | Kampe et al. | 709/201 |
| 2002/0002590 A1 | 1/2002 | King et al. | 709/206 |
| 2002/0003898 A1 | 1/2002 | Wu | 382/187 |
| 2002/0004803 A1 | 1/2002 | Serebrennikov | 715/513 |
| 2002/0007309 A1 | 1/2002 | Reynar | 705/14 |
| 2002/0023136 A1 | 2/2002 | Silver et al. | 709/206 |
| 2002/0026450 A1 | 2/2002 | Kuramochi | 707/104.1 |
| 2002/0029304 A1 | 3/2002 | Reynar et al. | 709/332 |
| 2002/0035581 A1 | 3/2002 | Reynar et al. | 715/513 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/206 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0110225 A1 | 8/2002 | Cullis | 379/67.1 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156792 A1 | 10/2002 | Gombocz et al. | 707/100 |
| 2002/0169802 A1 | 11/2002 | Brewer et al. | 707/513 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |
| 2003/0014745 A1 | 1/2003 | Mah et al. | 717/173 |
| 2003/0025728 A1* | 2/2003 | Ebbo et al. | 345/744 |
| 2003/0046316 A1 | 3/2003 | Gergic et al. | 707/513 |
| 2003/0051236 A1 | 3/2003 | Pace et al. | 717/177 |
| 2003/0056207 A1 | 3/2003 | Fischer et al. | 717/174 |
| 2003/0081791 A1 | 5/2003 | Erickson et al. | 380/282 |
| 2003/0084138 A1 | 5/2003 | Tavis et al. | 709/223 |
| 2003/0097318 A1 | 5/2003 | Yu et al. | 705/35 |
| 2003/0101204 A1 | 5/2003 | Watson | 708/206 |
| 2003/0101416 A1 | 5/2003 | McInnes et al. | 715/513 |
| 2003/0106040 A1 | 6/2003 | Rubin et al. | 717/106 |
| 2003/0115039 A1 | 6/2003 | Wang | 704/4 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1* | 8/2003 | Britton et al. | 707/3 |
| 2003/0158851 A1* | 8/2003 | Britton et al. | 707/100 |
| 2003/0172343 A1 | 9/2003 | Leymaster et al. | 715/500 |
| 2003/0192040 A1 | 10/2003 | Vaughan | 717/173 |
| 2003/0195937 A1 | 10/2003 | Kircher et al. | 709/207 |
| 2003/0212527 A1 | 11/2003 | Moore et al. | 702/179 |
| 2003/0220795 A1 | 11/2003 | Araysantiparb et al. | 704/275 |
| 2003/0229593 A1* | 12/2003 | Raley et al. | 705/55 |
| 2003/0233330 A1* | 12/2003 | Raley et al. | 705/55 |
| 2004/0003389 A1 | 1/2004 | Reynar et al. | 717/178 |
| 2004/0006741 A1* | 1/2004 | Radja et al. | 715/513 |
| 2004/0039990 A1 | 2/2004 | Bakar et al. | 715/505 |
| 2004/0133846 A1 | 7/2004 | Khoshatefeh et al. | 715/500 |
| 2004/0165007 A1 | 8/2004 | Shafron | 345/781 |
| 2004/0199861 A1 | 10/2004 | Lucovsky | 715/500 |
| 2004/0201867 A1 | 10/2004 | Katano | 358/1.15 |
| 2004/0236717 A1* | 11/2004 | Demartini et al. | 707/1 |
| 2005/0050164 A1* | 3/2005 | Burd et al. | 709/217 |
| 2005/0055330 A1* | 3/2005 | Britton et al. | 707/1 |
| 2005/0094850 A1 | 5/2005 | Nakao | 382/103 |
| 2005/0120313 A1 | 6/2005 | Rudd et al. | 715/866 |
| 2005/0187926 A1* | 8/2005 | Britton et al. | 707/3 |
| 2006/0173674 A1 | 8/2006 | Nakajima et al. | 704/9 |

FOREIGN PATENT DOCUMENTS

| | | |
|---|---|---|
| EP | 0481784 A2 | 4/1992 |
| EP | 0598511 A2 | 5/1994 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| JP | 64-88771 | 4/1989 |
| JP | 05-174013 | 7/1993 |
| JP | 09-138636 | 5/1997 |
| JP | 2001-125994 | 5/2001 |
| JP | 2002163250 A | 6/2002 |
| WO | WO 95/07510 A1 | 3/1995 |
| WO | WO 99/17240 A1 | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A2 | 2/2002 |
| WO | WO 2004/012099 A2 | 2/2004 |

OTHER PUBLICATIONS

M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.

G. Falquet et al., "Design and Analysis of Active Hypertext Views on Databases", Information Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Terveen, Loren, Will Hill and Brian Amento; *Constructing, organizing, and visualizing collections of tropically related Web resources*; ACM Trans. Comput.-um. Interact. 6, 1 (Mar. 1999) p. 67-94.

Barrett, Rob, Paul P. Maglio and Daniel C. Kellem; *How to personalize the Web*; Conference proceedings on human factors in computing systems (1997) p. 75-82.

Marx, Matthew and Chris Schmandt; *CLUES: dynamic personalized message filtering*; Proceedings of the ACM 1996 conference on computer supported cooperative work (1996) p. 113-121.
Goschka, Karl M. and Jurgen Falb; *Dynamic hyperlink generation for navigation in relational databases*; Proceedings of the tenth ACM conference on hypertext and hypermedia: returning to our diverse root (1999) p. 23-24.
Pentland, Alex; *Perceptual user interfaces: perceptual intelligence*; Commun. ACM 43, 3 (Mar. 2000) p. 35-44.
Stairmand, Mark A.; *Textual context analysis for information retrieval;* Proceedings of the 20th annual international ACM SIGIR conference on research and development in information retrieval (1997) p. 140-147.
Glushko, Robert J., Jay M. Tenenbaum and Bart Meltzer; *An XML framework for agent-based E-commerce*; Commun. ACM 42, 3 (Mar. 1999) p. 106.
Kukich, Karen; *Technique for Automatically Correcting Words in Text*; ACM Comput. Surv., 24, 4 (Dec. 1992); pp. 377-439.
Marx, Matt and Chris Schmandt; *Putting People First: Specifying Proper Names in Speech Interfaces*; Proceedings of the ACM Symposium on User Interface Software and Technology; 1994; pp. 29-37.
Ford, Bryan, Mike Hibler, Jay Lepreau, Roland McGrath and Patrick Tullman; *Interface and execution models in the fluke kernel*; Proceedings of the third symposium on operating systems design and implementation, (1999) p. 101-115.
Desmarais, Michel C. and Jiming Liu; *Exploring the applications user-expertise assessment for intelligent interfaces*; Proceedings of the conference on human factors in computing systems, (1993) p. 308-313.
Foley, James D.; *Future directions in user-computer interface software*; Conference proceedings on organizational computer systems, (1991) p. 289-297.
Hartson, H. Rex and Deborah Hix; *Human-computer interface development: concepts and systems for its management*; ACM Comput. Surv. 1 (Mar. 1989) p. 5-92.
Foley, Jim; *Integrating computer technology, people technology; strategies and case studies from Georgia Tech's Graphics, Visualization and Usability Center*; Proceedings of the workshop on advanced visual interfaces, (1994) p. 34-43.
Tsai, M., P. Reiher and G.J. Popek; *Command management system for next-generation user input*; Proceedings of the seventh workshop on hottopics in operating systems, (1999) p. 179-84.
*Microsoft Computer Dictionary*, Microsoft, Microsoft Press, Fifth Edition, p. 409.
Kuenning, Geoff, "Using ISPELL from Emacs", http://theochem.ki.ku.dk/on_line_docs/ispell/ispell_1.html, 4 pp., publication date unknown.
"Spellout Command", Commands Reference, vol. 5, http://www.rz.uni-hohenheim.de/betriebssysteme/unix/aix/aix_4.3.3_doc/base_doc/usr/ share/man/inf..., 1 page, publication date unknown.
"Chapter 8—Standard Input and Output", http://www.comp.lancs.ac.uk/computing/users/eiamjw/unix/chap8.html, 3 pp., publication date unknown.
Panagiotis, Christias, Man-cgi 1.15, http://www.physics.umn.edu/cgi-bin/man-cgi?spell, 1994, 5 pp.
Bischof, Hans-Peter, "Spell, Spellin, Spellout—Finding Spelling Errors", http://www.vorlesungen.uni-osnabrueck.de/informatik/shellscript/Html/Man/_Man_NeXt_html/html..., Apr. 21, 1997, 2 pp.
"Module 123—Spell", http://duplex.hypermart.net/books/bsd/501-504.html, 4 pp., publication date unknown.
Panagiotis, Christias, Man-cgi 1.15, http://www.calpoly.edu/cgi-bin/man-cgi?spell+1, 1994, 3 pp.
Martensson, Bengt, "Thread-Enhanced Spell Front End for GNU Emacs+Detex+Delatex", http://www.geocrawler.com/archives/3/337/1987/0/1871981/, Aug. 20, 1987, 1 page.
Willisson, Pace, Ispell (1), http://www.rt.com/man/findaffix.1.html, 1983, 15 pp.
Willisson, Pace, Ispell (1), "Use Commands", http://www.csee.usf.edu/cgi-bin/man-cgi?ispell, 1983, 18 pp.
"Handout 38: Spell Checking, Word Counting, and Textual Analysis", http://courses.cs.emporia.edu/pheattch/courses/2002/cd501s02/hand38/, 3 pp., publication date unknown.
Keunning, Geoff, "International Spell", http://fmg-www.cs.ucla.edu/geoff.ispell.html, 3 pp., publication date unknown.
Ispell 4, "Ispell—Format of Ispell Dictionaries and Affix Files", http://www.bigbiz.com/cgi-bin/manpage?4+ispell, 11 pp., publication date unknown.
McMahon, Lee. E., "SED—A Non-Interactive Text Editor", Bell Laboratories, Murray Hill, New Jersey 07974, Aug. 15, 1978, pp. 16.
Beitner, N.D.; Hall, W.; Goble, C.A., "Multimedia Support and Authoring in Microcosm: An Extended Model," Dept. of Electronics and Computer Science, Univ. of Southampton, Southampton SO17 IBJ, UK; Dept. of Computer Science, Univ. of Manchester, Oxford Road, Manchester M13 9PL, UK, pp. 1-12, publication date unknown.
IBM Corporation, "IBM Research Disclosure #368; Multimedia Hyperlinks Automatically Created For Reference Documents," *IBM Technical Disclosure* Bulletin, Jun. 1993, pp. 1-5.
*The Complete LINUX™ Operating System 5.2 Deluxe*, Red Hat, ® Macmillian Digital Publishing USA, A Viacom Company, Red Hat Software, Inc., ISBN 1-57595-199-1B, 1995-1998, pp. 1-385.
*User Manual For AddressMate and AddressMate Plus*, CoStar Corporation, AddressMate Software, 1994-1995, pp. 1-210.
Getting Results With Microsoft® Office 97, *Real World Solutions For The Work You Do*, Microsoft Corporation, 1995-1997, pp. 1-703.
*InfoCentral™ 7*, User's Manual, Corel Corporation, vol. 1, Version 7.0, 1996, pp. 1-86.
Corel® Office Professional 7 Quick Results User's Manual, vol. 1, Version 7.0 (first printing), Corel Corporation, Limited, pp. 1-531, publication date unknown.
Novell GroupWise User's Guide for Windows 16-Bit Version 5.2, Novell, Inc., 1993-1997, pp. 1-231.
Novell GroupWise User's Guide for Windows 32-Bit Version 5.2, Novell, Inc., 1998, pp. 1-318.
Claris Em@iler Getting Started User's Guide, For Macintosh, Claris Corporation, 1995-1997, 61 pp.
Developer's Guide To Apple Data Detectors, For Verison 1.0.2., Apple Computer, Inc., 1997, pp. 1-33.
Apple Data Detectors User's Manual, Apple Computer, Inc., 1997, pp. 1-15.
Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.
Hewkin, "Smart Tags-the Distributed-Memory Resolution", IEE Review, Jun. 22, 1989, pp. 203-206.
Measuring Units Conversion Table—http://web.archive.org- 1997 Internet French Property, pp. 1-4.
IBM Technical Disclosure Bulletin, "National Language Support Enhancement for Culture-Specific Operations", Nov. 1, 1993, vol. 36, Issue 11, pp. 629-638.
Towers, J. Tarin, Visual Quickstart Guide: Dreamweaver 2 for Windows and Macintosh, 1999, Peachpit Press, pp. 150-151.
Driza, Scott, "Learn Word 2000 VBA Document Automation", Wordware Publishing Inc., 2001, 6 pp.
Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.
Menu Customizing, IBM Technical Disclosure Bulletin, vol. 34, No. 1, Jun. 1991, pp. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using.html, download date: Sep. 28, 1999, 1 pp.
"What is Flyswat", http://www.flyswat.com, download date: Sep. 28, 1999, 5 pp.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markuo Language (XML)", W3C Architecture Domain, http://web.archive.org/web/200212962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Link and Functoids By Using Grid Preview", http://msdn.microsoft.com/library/en-us/bts_2002/htm/lat_xmltools_map_check_fuwn.as..., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

"Integrated Development Enviorment (IDE)", http://web.archive.org/web/20020602032242/http:altova.com/products_ide.html, Jun. 2002, pp. 1-2.

"Altova markup your mind!" http://web.archive.org/web/20021204211721/http://altova.com/products_ide.html, Dec. 2002, pp. 1-3.

Arbortext, "Arbortext and Accessibility", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1999, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference on System Sciences, 1998, pp. 44-53.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

Harold, E.R., "XML: Extensible Markup Language", IDG Books Worldwide, Books 24x7.com printout, 1998, pp. 1-11.

Marais, Hannes, "Supporting Cooperative and Personal Surfing With a Desktop Assistant", 1997, ACM Press, pp. 129-138.

U.S. Appl. No. 09/818,157, filed Mar. 27, 2001, entitled "Automatically Adding Proper Names to a Database".

U.S. Appl. No. 09/841,265, filed Apr. 24, 2001, entitled "Method and System for Applying Input Mode Bias".

U.S. Appl. No. 09/841,266, filed Apr. 24, 2001, entitled "Method and System for Providing Electronic Commerce Actions Based on Semantically Labeled Strings".

U.S. Appl. No. 09/906,552, filed Jul. 16, 2001, entitled "Method and System for Providing Restricted Actions for Recognized Semantic Categories".

U.S. Appl. No. 09/906,467, filed Jul. 16, 2001, entitled "Application Program Interfaces for Semantically Labeling Strings and Providing Actions Based on Semantically Labeled Strings".

U.S. Appl. No. 09/907,418, filed Jul. 17, 2001, entitled "Method and System for Defining Semantic Categories and Actions".
U.S. Appl. No. 09/588,411, filed Jun. 6, 2000, entitled "Method and System for Semantically Labeling Strings and Providing Actions Based on Semantically Labeled Strings".
U.S. Appl. No. 10/141,712, filed May 9, 2002, entitled "Method, System, and Apparatus for Converting Dates Between Calendars and Languages Based Upon Semantically Labeled Strings".
U.S. Appl. No. 10/154,630, filed May 23, 2002, entitled "Method, System, and Apparatus for Converting Numbers Based Upon Semantically Labeled Strings".
U.S. Appl. No. 10/140,544, filed May 7, 2002, entitled "Method, System, and Apparatus for Converting Numbers Between Measurement Systems Based Upon Semantically Labeled Strings".
U.S. Appl. No. 10/155,680, filed May 23, 2002, entitled "Method, System, and Apparatus for Converting Currency Values Based Upon Semantically Labeled Strings".
U.S. Appl. No. 10/164,960, filed Jun. 6, 2002, entitled "Providing Contextually Sensitive Actions and Help Content in Computer-Generated Documents".
U.S. Appl. No. 10/164,260, filed Jun. 5, 2002, entitled "Mechanism for Downloading Software Components from a Remote Source for Use by a Local Software Application".
U.S. Appl. No. 10/179,810, filed Jun. 25, 2002, entitled "Method, System, and Apparatus for Performing Custom Actions on Digital Content".
U.S. Appl. No. 10/178,680, filed Jun. 24, 2002, entitled "System and Method for Incorporating Smart Tags in Online Content".
U.S. Appl. No. 10/179,438, filed Jun. 25, 2002, entitled "Method and System for Dynamically Providing Actions Associated with Semantically Labeled Strings".
U.S. Appl. No. 10/184,298, filed Jun. 27, 2002, entitled "Method and System for Associating Actions with Semantic Labels in Electronic Documents".
U.S. Appl. No. 10/377,258, filed Feb. 28, 2003, entitled "Method and System for Enhancing Paste Functionality of a Computer Software Application".
U.S. Appl. No. 10/426,446, filed Apr. 29, 2003, entitled "Methods and System for Recognizing Names in a Computer-Generated Document and for Providing Helpful Actions Associated with Recognized Names".
U.S. Appl. No. 10/608,267, filed Jun. 27, 2003, entitled "Leveraging Markup Language Data for Semantically Labeling Text Strings and Data for Providing Actions Based on Semantically Labeled Text Strings and Data".
U.S. Appl. No. 10/780,376, filed Feb. 17, 2004, entitled "Methods and Systems for Providing Automatic Actions on Recognized Text Strings in a Computer-Generated Document".
U.S. Appl. No. 10/183,317, filed Jun. 25, 2002, entitled "System and Method for Issuing a Message to a Program".
U.S. Official Action dated Dec. 29, 2003 in U.S. Appl. No. 09/588,411.
U.S. Official Action dated Feb. 12, 2004 in U.S. Appl. No. 10/154,630.
U.S. Official Action dated Mar. 29, 2004 in U.S. Appl. No. 09/906,552.
U.S. Official Action dated Jun. 14, 2004 in U.S. Appl. No. 09/588,411.
U.S. Official Action dated Jun. 18, 2004 in U.S. Appl. No. 09/818,157.
U.S. Official Action dated Jul. 15, 2004 in U.S. Appl. No. 09/906,467.
U.S. Official Action dated Aug. 20, 2004 in U.S. Appl. No. 09/841,266.
U.S. Official Action dated Sep. 29, 2004 in U.S. Appl. No. 09/907,418.
U.S. Official Action dated Oct. 6, 2004 in U.S. Appl. No. 09/818,157.
U.S. Official Action dated Nov. 2, 2004 in U.S. Appl. No. 10/178,680.
U.S. Official Action dated Dec. 8, 2004 in U.S. Appl. No. 09/588,411.
U.S. Official Action dated Jan. 25, 2005 in U.S. Appl. No. 09/906,552.
U.S. Official Action dated Jan. 26, 2005 in U.S. Appl. No. 10/154,630.
U.S. Official Action dated Mar. 1, 2005 in U.S. Appl. No. 09/818,157.
U.S. Official Action dated Mar. 17, 2005 in U.S. App. No. 09/841,265.
U.S. Official Action dated Mar. 24, 2005 in U.S. Appl. No. 10/141,712.
U.S. Official Action dated Apr. 8, 2005 in U.S. Appl. No. 10/164,960.
U.S. Official Action dated Apr. 19, 2005 in U.S. Appl. No. 09/841,266.
U.S. Official Action dated May 5, 2005 in U.S. Appl. No. 09/906,467.
U.S. Official Action dated May 6, 2005 in U.S. Appl. No. 09/907,418.
U.S. Official Action dated May 20, 2005 in U.S. Appl. No. 10/184,298.
U.S. Official Action dated Jun. 3, 2005 in U.S. Appl. No. 10/154,630.
U.S. Official Action dated Jun. 6, 2005 in U.S. Appl. No. 10/164,260.
U.S. Official Action dated Jun. 24, 2005 in U.S. Appl. No. 10/140,544.
U.S. Official Action dated Jul. 25, 2005 in U.S. Appl. No. 10/179,438.
U.S. Official Action dated Sep. 2, 2005 in U.S. Appl. No. 10/366,141.
U.S. Official Action dated Oct. 4, 2005 in U.S. Appl. No. 10/183,317.
U.S. Official Action dated Oct. 5, 2005 in U.S. Appl. No. 10/179,810.
U.S. Official Action dated Oct. 20, 2005 in U.S. Appl. No. 09/906,552.
U.S. Official Action dated Nov. 10, 2005 in U.S. Appl. No. 10/164,260.
U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 5, 2005 in U.S. Appl. No. 09/907,418.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
U.S. Official Action dated Feb. 16, 2006 in U.S. Appl. No. 10/184,298.
U.S. Official Action dated Feb. 24, 2006 in U.S. Appl. No. 10/154,630.
U.S. Official Action dated Apr. 5, 2006 in U.S. Appl. No. 10/377,258.
U.S. Official Action dated Apr. 10, 2006 in U.S. Appl. No. 10/179,810.
U.S. Official Action dated Apr. 17, 2006 in U.S. Appl. No. 10/179,438.
U.S. Official Action dated May 26, 2006 in U.S. Appl. No. 09/588,411.
U.S. Official Action dated May 31, 2006 in U.S. Appl. No. 10/141,712.
U.S. Official Action dated Jun. 1, 2006 in U.S. Appl. No. 10/366,141.
U.S. Final Official Action dated Jul. 19, 2006 in U.S. Appl. No. 09/906,552.
U.S. Official Action dated Aug. 2, 2006 in U.S. Appl. No. 10/731,899.
U.S. Official Action dated Aug. 9, 2006 cited in U.S. Appl. No. 10/164,960.
U.S. Final Official Action dated Aug. 18, 2006 cited in U.S. Appl. No. 09/907,418.
U.S. Official Action dated Sep. 7, 2006 cited in U.S. Appl. No. 10/155,680.
U.S. Official Action dated Sep. 28, 2006 cited in U.S. Appl. No. 10/608,267.
U.S. Final Official Action dated Oct. 5, 2006 cited in U.S. Appl. No. 09/841,266.
U.S. Official Action dated Oct. 6, 2006 cited in U.S. Appl. No. 10/140,544.
U.S. Official Action dated Oct. 10, 2006 cited in U.S. Appl. No. 09/841,265.
European Communication dated Apr. 19, 2006 in EP 05 000 506.5-1527.
U.S. Final Office Action dated Oct. 19, 2006 cited in U.S. Appl. No. 09/906,467.
European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

European Communication dated Nov. 9, 2006 in EP 03010292.5.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.

U.S. Office Action dated Nov. 9, 2006 cited in U.S. Appl. No. 10/184,298.

U.S. Office Action dated Nov. 15, 2006 cited in U.S. Appl. No. 10/179,438.

U.S. Official Action dated Dec. 20, 2006 in U.S. Appl. No. 10/154,630.

U.S. Final Official Action dated Dec. 26, 2006 in U.S. Appl. No. 10/179,810.

U.S. Official Action dated Jan. 5, 2007 in U.S. Application No. 10/183,717.

U.S. Official Action dated Jan. 25, 2007 in U.S. Appl. No. 10/608,267.

European Communication dated Nov. 17, 2006 in EP 03 011 850.7-2211.

European Communication dated Dec. 11, 2006 in EP 03 012 830.0-2211.

Singapore Search Report/Written Opinion dated Jan. 26, 2007 in SG 200500214-2.

U.S. Official Action dated Feb. 6, 2007 cited in U.S. Appl. No. 09/588,411.

U.S. Official Action dated Feb. 7, 2007 cited in U.S. Appl. No. 10/179,438.

U.S. Official Action dated Feb. 21, 2007 cited in U.S. Appl. No. 10/366,141.

European Communication dated Feb. 16, 2007 cited in European Application No. 04 003 683.2-2211.

Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.

Rice, F.C., "Transform XML Files with XSLT When Importing into Microsoft Excel 2002," Jul. 2001, Internet article, XP-002420701, http://msdn2.microsoft.com/en-us/library/aa140055(office.10.d=printer).aspx, 9 pgs.

Johnson, L., "What's So Special About Paste Special?", Jun. 2002, Internet article, XP-002420702, http://pubs.logicalexpressions.com/Pub0009/LPMArticle.asp?ID=40, 5 pgs.

Anonymous, "Moving and Copying Text Tutorial," Aug. 17, 2001, Internet Article, XP-002307566, http://tutorials.findtutorials.com/read/category/102/id/342/p/3, 4 pgs.

U.S. Official Action dated Mar. 9, 2007 cited in U.S. Appl. No. 10/426,446.

U.S. Official Action dated Mar. 12, 2007 cited in U.S. Appl. No. 10/141,712.

U.S. Official Action dated Apr. 10, 2007 cited in U.S. Appl. No. 09/907,418.

U.S. Official Action dated May 14, 2007 cited in U.S. Appl. No. 09/906,552.

U.S. Final Official Action dated May 18, 2007 cited in U.S. Appl. No. 10/155,680.

U.S. Official Action dated May 30, 2007 cited in U.S. Appl. No. 09/906,467.

U.S. Final Official Action dated Jun. 15, 2007 cited in U.S. Appl. No. 10/731,899.

Blaheta et al., "Assigning Function Tags to Parsed Text," Morgan Kaufmann Publishers Inc., 2000, pp. 234-240.

U.S. Office Action dated Jun. 28, 2007 cited in U.S. Appl. No. 09/841,266.

U.S. Final Office Action dated Jul. 12, 2007 cited in U.S. Appl. No. 10/184,298.

U.S. Office Action dated Jul. 13, 2007 cited in U.S. Appl. No. 10/154,630.

U.S. Office Action dated Jul. 20, 2007 cited in U.S. Appl. No. 09/841,265.

U.S. Final Office Action dated Jul. 26, 2007 cited in U.S. Appl. No. 10/164,960.

U.S. Office Action dated Aug. 10, 2007 cited in U.S. Appl. No. 10/179,810.

U.S. Office Action dated Sep. 16, 2007 cited in U.S. Appl. No. 10/179,438.

Malaysian Search Report dated Aug. 2, 2007 cited in Malaysian Application No. PI 20040265.

U.S. Office Action dated Sep. 27, 2007 cited in U.S. Appl. No. 10/608,267.

U.S. Appl. No. 11/924,856, filed Oct. 26, 2007 entitled "Providing Contextually Sensitive Tools and Help Content in Computer-Generated Documents".

U.S. Official Action dated Oct. 9, 2007 cited in U.S. Appl. No. 10/183,317.

U.S. Final Office Action dated Oct. 16, 2007 cited in U.S. Appl. No. 09/907,418.

U.S. Official Action dated Oct. 17, 2007 cited in U.S. Appl. No. 10/155,680.

U.S. Final Office Action dated Oct. 19, 2007 cited in U.S. Appl. No. 09/588,411.

U.S. Final Office Action dated Oct. 19, 2007 cited in U.S. Appl. No. 10/141,712.

U.S. Final Office Action dated Oct. 30, 2007 cited in U.S. Appl. No. 09/906,552.

European Communication dated Sep. 25, 2007 cited in European Application No. 03 014 181.6-1243.

Japanese Official Action dated Oct. 19, 2007 cited in Japanese Application No. 2003-128417.

Rubin, Charles, "Microsoft Word 2000 Official Manual," First Edition, Nikkei BP Soft Press, Inc., Aug. 2, 1999, pp. 215-217.

U.S. Final Office Action dated Dec. 7, 2007 cited in U.S. Appl. No. 10/426,446.

Russian Official Action dated Oct. 11, 2007 cited in Russian Application No. 2003118722.

Pershikov, V.I., "Explanatory Dictionary in Informatics," Finances and Statistics, Moscow, 1991 (in Russian with translated sections) 5 pgs.

U.S. Final Office Action dated Dec. 18, 2007 cited in U.S. Appl. No. 10/366,141.

U.S. Final Office Action dated Dec. 26, 2007 cited in U.S. Appl. No. 09/841,265.

U.S. Office Action dated Dec. 26, 2007 cited in U.S. Appl. No. 10/377,258.

U.S. Final Office Action dated Jan. 7, 2008 cited in U.S. Appl. No. 10/179,438.

U.S. Final Office Action dated Jan. 9, 2008 cited in U.S. Appl. No. 09/906,467.

David D. Lewis et al., "A Sequential Algorithm for Training Text Classifiers," Spring-Verlag New York, Inc., 1994, pp. 1-10.

U.S. Office Action dated Jan. 25, 2008 cited in U.S. Appl. No. 10/608,267.

Chinese Official Action dated Dec. 28, 2007 cited in U.S. Appl. No. 200410005390.8.

Wei Ying-bin et al., "A New Technology ColdFusion of Realizing Dynamic Webpage," 2000, 6 pgs. (English language translation, pp. 1-6).

U.S. Office Action dated Feb. 8, 2008 cited in U.S. Appl. No. 10/141,712.

U.S. Office Action dated Feb. 15, 2008 cited in U.S. Appl. No. 10/731,899.

U.S. Final Office Action dated Feb. 20, 2008 cited in U.S. Appl. No. 10/154,630.

Singapore Examination Report (conducted by Austrian Patent Office) dated Jan. 25, 2008 in SG Application No. 200500214-2.

Chinese Office Action dated Jan. 4, 2008 cited in Chinese Application No. 200510009487.0.

Chinese Oficcial Action dated Dec. 28, 2007 cited in Applicaton No. 200410005390.8.

Wei Ying-bin et al., "A New Technology ColdFusion of Realizing Dynamic Webpage," 2000, 6 pgs. (English language translation, pp. 1-6).

European Examination Report dated Mar. 4, 2006 cited in EP Application No. 02 014 717.9-1527.

European Examination Report dated Mar. 4, 2006 cited in EP Application No. 03 012 432.5-1527.

Russian Official Action dated Jan. 11, 2008 cited in Russian Application No. 2004105880/09(006292).

V. Doroth et al., "Modern Computer Vocabulary," St. Petersburg, BHV-Peterburg, 2001, p. 465 (with English language translation).

* cited by examiner

SYSTEM AND METHOD FOR PROVIDING
NAMESPACE RELATED INFORMATION

BACKGROUND OF THE INVENTION

Extensible Markup Language (XML) has attained wide popularity in recent years. XML is a universal language that provides a way to identify, exchange, and process various kinds of data. For example, XML is used to create documents that can be utilized by a variety of application programs on computer of different manufacture.

To ensure that computer application programs understand the content of an XML document, an XML schema may be used to define the structure, content, and semantics of the XML document. Typically, the XML schema is identified in the XML document by a namespace, which is a unique identifier of the XML document's type. A namespace is typically identified by a Uniform Resource Identifier (URI).

With conventional systems, when a computer application program attempts to open a new or an existing XML document that is identified by a URI, the computer application program must somehow determine how it should handle the document. For example, the computer application program must decide how the XML document should be displayed, what types of behaviors the document should have, and where the XML schema associated with the document is located so that it can ensure the document's validity. In order to locate resources for handling the XML document in the conventional systems, the computer application program may look for pointers in the document, or prompting the user for information. These extra steps create delays and require undue effort by the user. Furthermore, the steps would likely have to be repeated when the computer application program encounters another document of the same type or when documents of the same type are encountered by another computer application program running on the same computer. Moreover, unsophisticated user may be confused when prompted for resources such as an XML schema.

SUMMARY OF THE INVENTION

Briefly stated, this invention is directed to a system and method for centrally providing namespace related information to application programs executing on a computer. A namespace library is configured to provide namespace related information to application programs executing on a computer. The application programs are configured to open new or existing XML documents. When one of the application programs is opening an XML document that contains a namespace, the application program queries the namespace library using the namespace to obtain namespace related information. In one aspect, the namespace related information may include a location identifier associated with a solution that enables the application program to handle the XML document.

In another aspect, the invention is directed to a data structure having a namespace data field and an information data field. The namespace data field includes namespaces and serves as an index to the information data field. The information data field includes namespace related information associated with the corresponding namespace. The namespace related information may include a solution.

In yet another aspect, the invention is directed to a method for obtaining namespace related information to handle an XML document. The method determines a namespace in the XML document and uses the namespace to query a namespace library. If an entry for the namespace exists in the namespace library, the method retrieves namespace related information associated with the namespace. If a solution for the namespace exists, the method obtains the solution and applies the solution to handle the XML document.

DETAILED DESCRIPTION OF THE PREFERRED
EMBODIMENT

Briefly stated, this invention is directed to a system and method for providing namespace related information. A namespace library operating in a computer provides a central source of namespace related information for handling XML documents. The namespace related information may be used by other computer application programs operating in the computer. The namespace related information provided by the namespace library is indexed by namespace. Many types of namespace related information may be associated with each namespace. For example, the namespace related information may include XML schemas and Extensible Style Language Transform (XSLT) that are associated with the namespace. The computer application programs may obtain namespace related information by querying the namespace library using a particular namespace.

Figure 1:
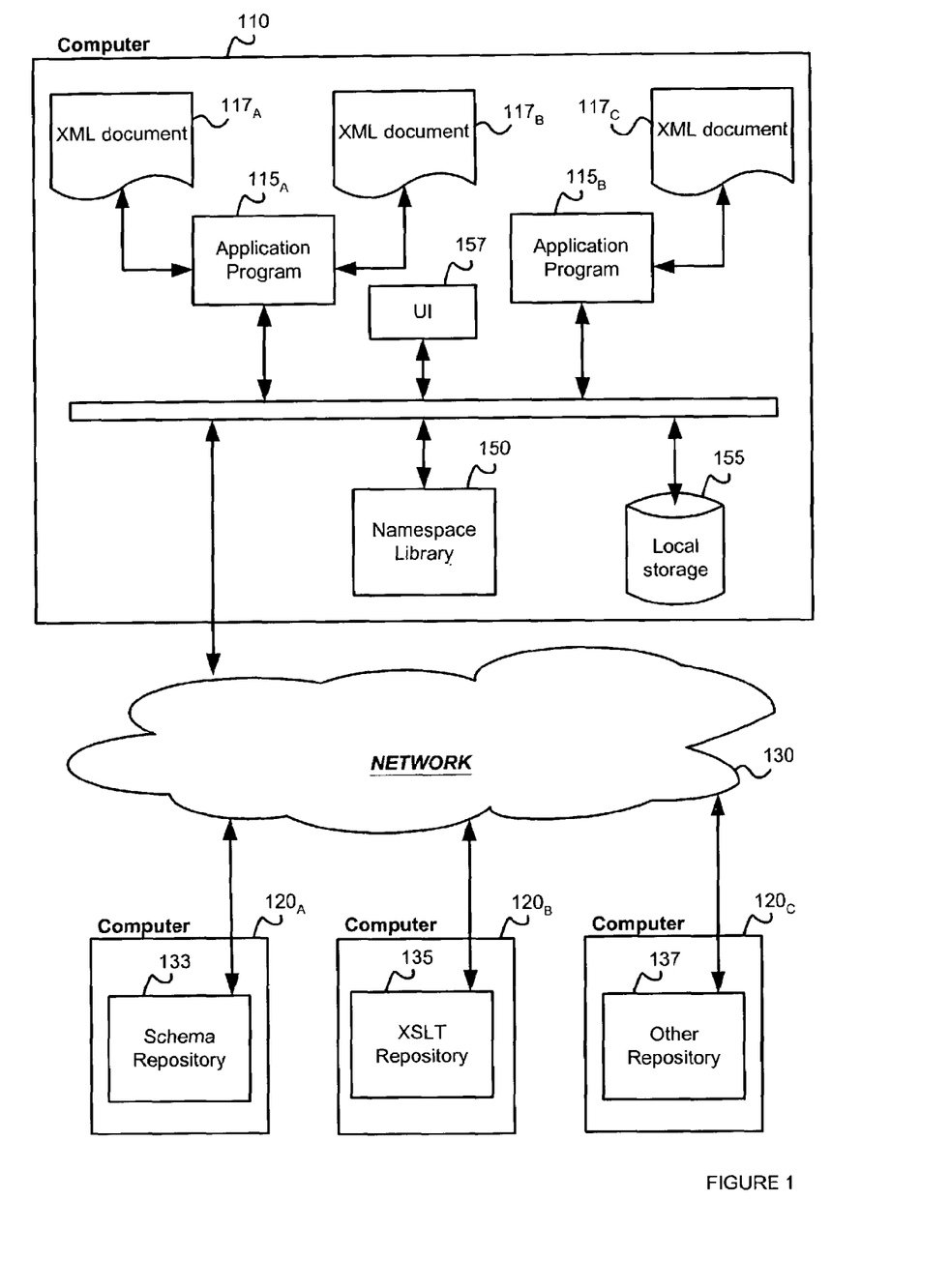
FIG. 1 shows an exemplary computing environment in which this invention may be implemented.

FIG. 1 and the following discussion are intended to provide a brief general description of a suitable computing environment in which the invention may be implemented. Although not required, this invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that this invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 1 shows an exemplary computing environment in which this invention may be implemented. Computer 110 offers a computing environment in which computer executable components, such as application programs $115_{A-B}$, Namespace library 150, and namespace library user interface 157, may operate. Computer 110 also allows application programs $115_{A-B}$ and namespace library 150 to interact with other computers, such as remote computers $120_{A-C}$, through a network 130.

Application programs $115_{A-B}$ are configured to open new or existing XML documents, such as XML documents $117_{A-C}$. Each of XML documents $117_{A-C}$ is associated with at least one namespace. Application programs $115_{A-B}$ are also configured to query namespace library 150 to identify information related to one or more namespaces associated with XML documents $117_{A-C}$. The information enables application programs $115_{A-B}$ to handle XML documents $117_{A-C}$.

Local storage 155 may include one or more permanent mass storage devices, such as hard disk drive, tape drive, optical drive, floppy disk drive, and the like. Local storage 155 provides a medium for storing data in computer 110. These data may include information used by application programs $115_{A-B}$ and namespace library 150, such as the several XML documents 117 and XML schemas, and the like. Network 130 may be any network capable of connecting computers. Examples of network 130 include a local area network (LAN) and a wide area network (WAN), such as the Internet.

Remote computers $120_{A-C}$ are connected to network 130 and are configured to interact with other computers through network 130. One type of interaction is to provide information to the other computers. Accordingly, one of the functions performed by computers $120_{A-C}$ is to serve as a repository of information. As shown in the figure, computers $120_{A-C}$ may include schema repository 133, XSLT repository 135, and other repository 137. Schema repository 133 is a collection of XML schemas. Each of the schemas is identified by a particular namespace. Likewise, XSLT repository 135 is a collection of XSLTs, each being identified by a particular namespace. Other repository 137 is a collection of other information related to namespaces. In the figure, schema repository 133, XSLT repository 135, and other repository 137 are each stored in a separate computer. It is to be appreciated that multiple types of repositories may be stored on the same computer.

Namespace library 150 is a component of computer 110 that provides namespace related information to application programs. In one embodiment of the invention, namespace library 150 is implemented in the registry of computer 110's operating system. Namespace related information provided by namespace library 150 will be discussed in more details in conjunction with FIG. 2. Briefly stared, namespace related information is information related to creating, editing, viewing, or using XML documents. In namespace library 150, namespace related information is indexed by namespace.

User interface 157 is a computer/user interface that allows users to interact with namespace library 150. User interface 157 will be discussed in more detail in conjunction with FIG. 6. Briefly stated, user interface 157 enables a user to add, edit, and remove namespace related information provided by namespace library 150.

Figure 2:
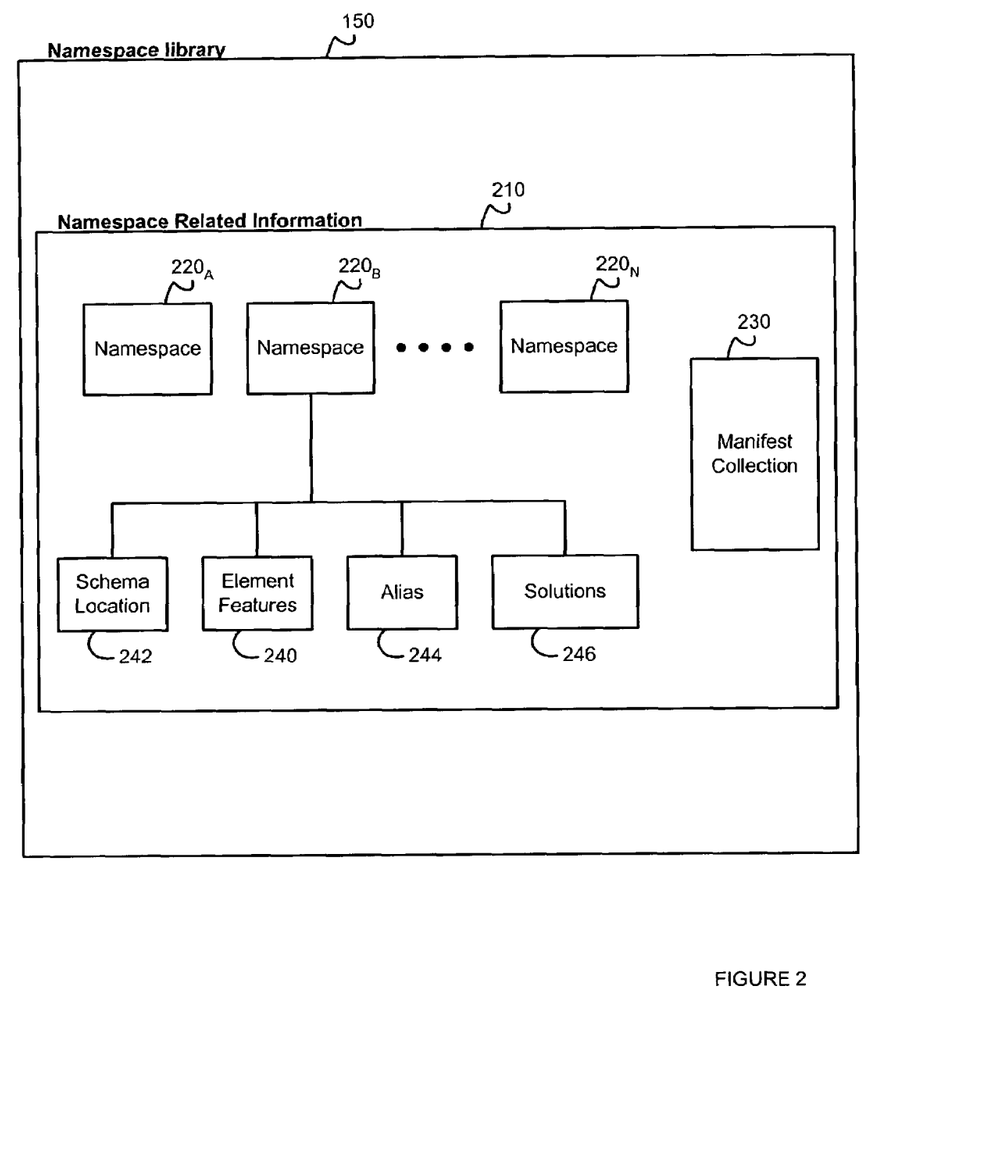
FIG. 2 is a schematic diagram of namespace related information provided by an Namespace library.

FIG. 2 is a schematic diagram of namespace related information 210 provided by a namespace library 150. As illustrated in the figure, the namespace related information 210 contains a plurality of namespaces $220_{A-N}$. Associated with each namespace is namespace related information indexed to the namespaces $220_{A-N}$. Manifest collection 230 contains both indexing namespaces and information related to namespaces.

Namespaces $220_{A-N}$ are namespaces on which namespace library 150 may provide namespace related information 210. As shown in the figure, namespace related information 210 may include many more namespaces than those shown in the figure. Namespaces are typically identified by Uniform Resource Identifiers (URIs). Information related to namespace $220_B$ is shown in the figure for the purposes of illustration and includes element features 240, schema location 242, alias 244, and solutions 246.

Schema location 242 is an identifier that indicates where the primary schema associated with namespace $220_B$ is located. In this implementation, each of the namespaces $220_{A-N}$ is associated with at least one primary schema. Other schemas may be identified in solutions 246. Schema location 242 may indicate a location in local storage or a persistent location at a remote storage address.

Element features 240 contain information about the elements associated with the primary schema. Element features will be discussed in detail in conjunction with FIG. 4. Briefly stated element features 240 may include a list of all the elements that are specified in the primary schema as well as features associated with each of the specified elements.

Alias 244 is a friendly name of the namespace that may be used by an application program when presenting the namespace and the primary schema to the user. As discussed above, the namespace is typically identified by a URI, which is typically a very complicated and long string. Alias 244 enables the application program to present the namespace and the primary schema to the user in a user-friendly manner.

Solutions 246 are namespace related information that identifies resources which enable an application program to properly and effectively handle an XML document associated with namespace $220_B$. Solutions 246 will be discussed in conjunction with FIG. 3. Briefly stated, solutions 246 include information on other schemas, and files that are associated with a namespace and are available for use by application programs or users.

Manifest collection 230 is a collection of information regarding schema manifests. Manifest collection 230 will be discussed in more detail in conjunction with FIG. 5. Briefly stated, manifest collection 230 makes the namespace library 150 aware of information related to many namespaces without locally storing the actual information. Manifest collection 230 may contain the location of individual schema manifests. Each schema manifest is associated with a particular namespace and contains information related to the namespace.

Figure 3:
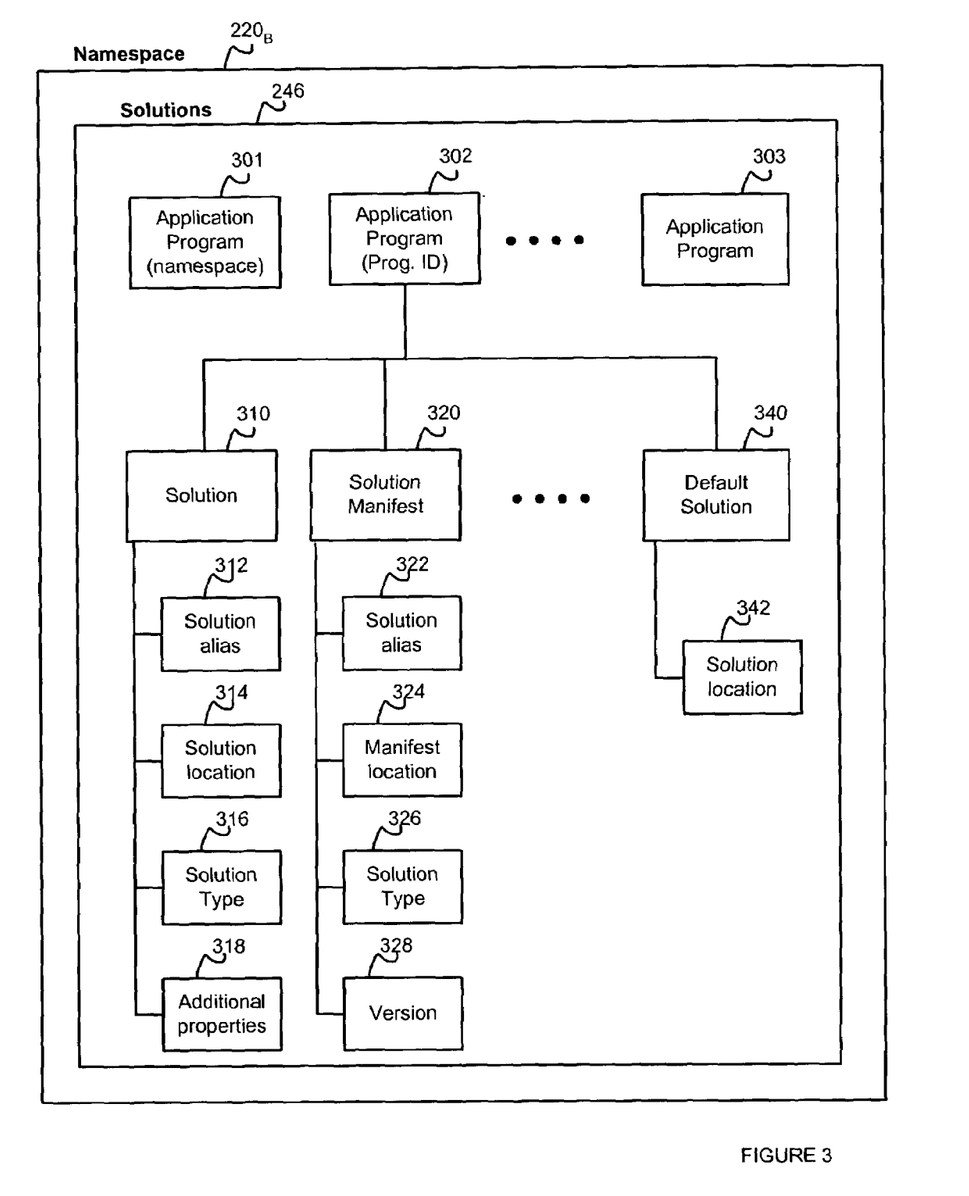
FIG. 3 is a schematic diagram of solutions associated with a namespace.

FIG. 3 is a schematic diagram of solutions 246 associated with a namespace $220_B$. Solutions 246 identify resources, such as files, programs, and other data, that may be used by application programs to provide a content-rich and user-friendly experience for the user in creating, editing, viewing, or using an XML document. As shown in the figure, solutions 246 include a plurality of application program identifiers 301-303, each identifying a particular application program. Application program identifiers 301-303 may be a namespace, a program identification, or the like. A variety of solutions may be indexed to each of application program identifiers 301-303. For illustrative purposes, solution 310, solution manifest 320, and default solution 340 for application program identifiers 302 are shown in the figure. It is to be understood that solutions 246 may identify many more resources and solution manifests of the types illustrated in FIG. 3 as well as other types of similar solutions.

Solution 310 is a typical solution that may be associated with namespace $220_B$ and application program identifier 302. Solution 310 may refer to many different types of files that can be used by the application program in conjunction with the XML document. Examples of these files include XML schema, XSLT, and the like.

Solution 310 may also contain multiple properties that may enhance the value of the solution to the application program and the user. As illustrated, the properties of solution 310 may include solution alias 312, solution location 314, solution type 316, and additional properties 318.

Solution alias 312 is a friendly name of the solution that may be used by an application program when presenting the solution to the user. The friendly name may be descriptive of the actions to be performed by the application program using the solution or the results of the actions. Solution location 314 is an identifier that indicates where the solution is located. Solution location 314 may indicate a location in local storage or a persistent location at a remote storage address. Solution type 316 is an identifier that indicates the particular type of solution 310, such as transforms, schema, etc. Additional properties 318 include other properties that may similarly enhance the value of solution 310 to the application program and the user.

Solution manifest 320 is an XML file that defines where the application program should go to obtain solution related infonnarion. Solution manifest 320 makes the namespace library to be aware of many solutions without locally storing the solutions. Solution manifest 320 may include many properties, such as solution alias 322, solution type 326, and version 328. Solution alias 322 is a friendly name of solution manifest 320. Solution type 326 indicates the particular type of solution that is defined by solution manifest 320. Manifest location 324 is the persistent storage location of solution manifest 320. Version 328 indicates the version of solution manifest 320, which may be shown to the user by the application program.

Default solution 340 identifies the solution that is used if no solution or solution manifest is associated with namespace $220_B$ and application identifier 302. The solution identified by default solution 340 is specific to the application program associated with application program identifier 302. Default solution 340 may contain solution location 342, which is a property of default solution 340 that indicates its location. Default solution 340 is typically stored in local storage.

Figure 4:
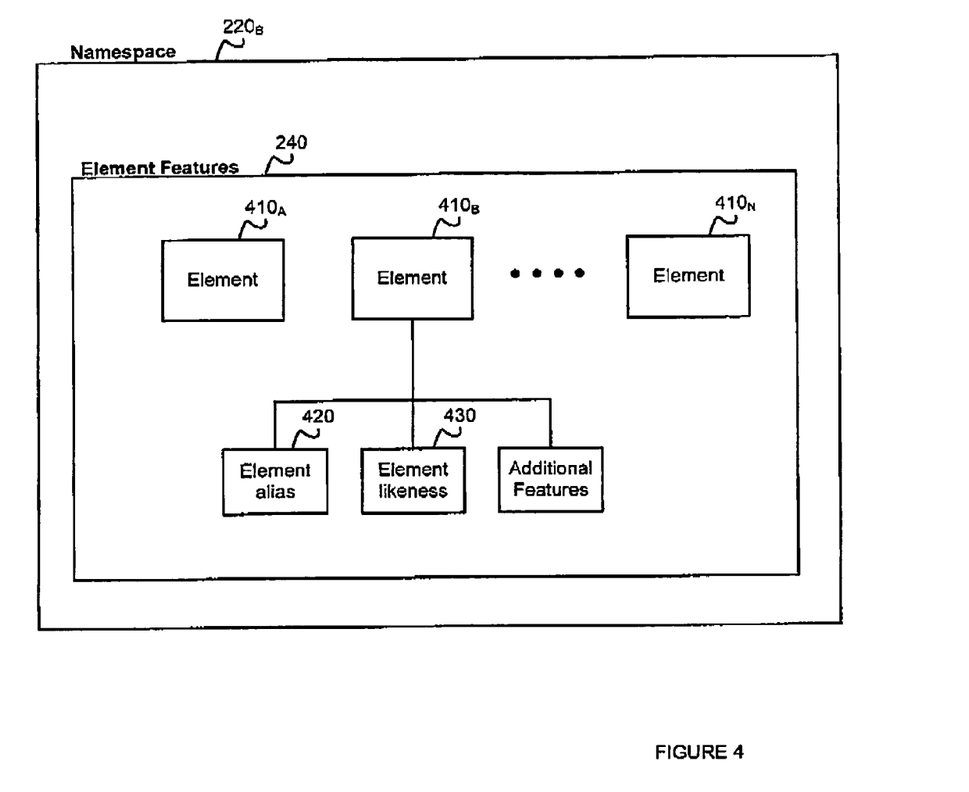
FIG. 4 is a schematic diagram of element features associated with a namespace.

FIG. 4 is a schematic diagram of element features 240 associated with a namespace $220_B$. An application program using a primary schema that is identified by namespace $220_B$ may use element features 240 to further identify elements specified by the primary schema.

As shown in the figure, element features 240 include a list of elements $410_{A-N}$, which are specified by the primary schema. The application program may allow elements $410_{A-N}$ to be used in accordance with the primary schema and the features that are available to elements $410_{A-N}$. As an example, the features of element $410_B$ include element alias 420 and element likeness 430.

Element alias 420 is a friendly name of element $410_B$ that may be used by an application program when presenting the element to the user for inclusion in an XML document. The friendly name may be descriptive of the type content in element $410_B$. Element likeness 430 may contain instructions that direct the application program to treat element $410_B$ and offer features associated with it as if it is another element with which the application program is familiar. It is to be understood that the features shown are just for illustration and that many more similar element features may be included in element features 240, such as styles used by a word processor for displaying elements.

Figure 5:
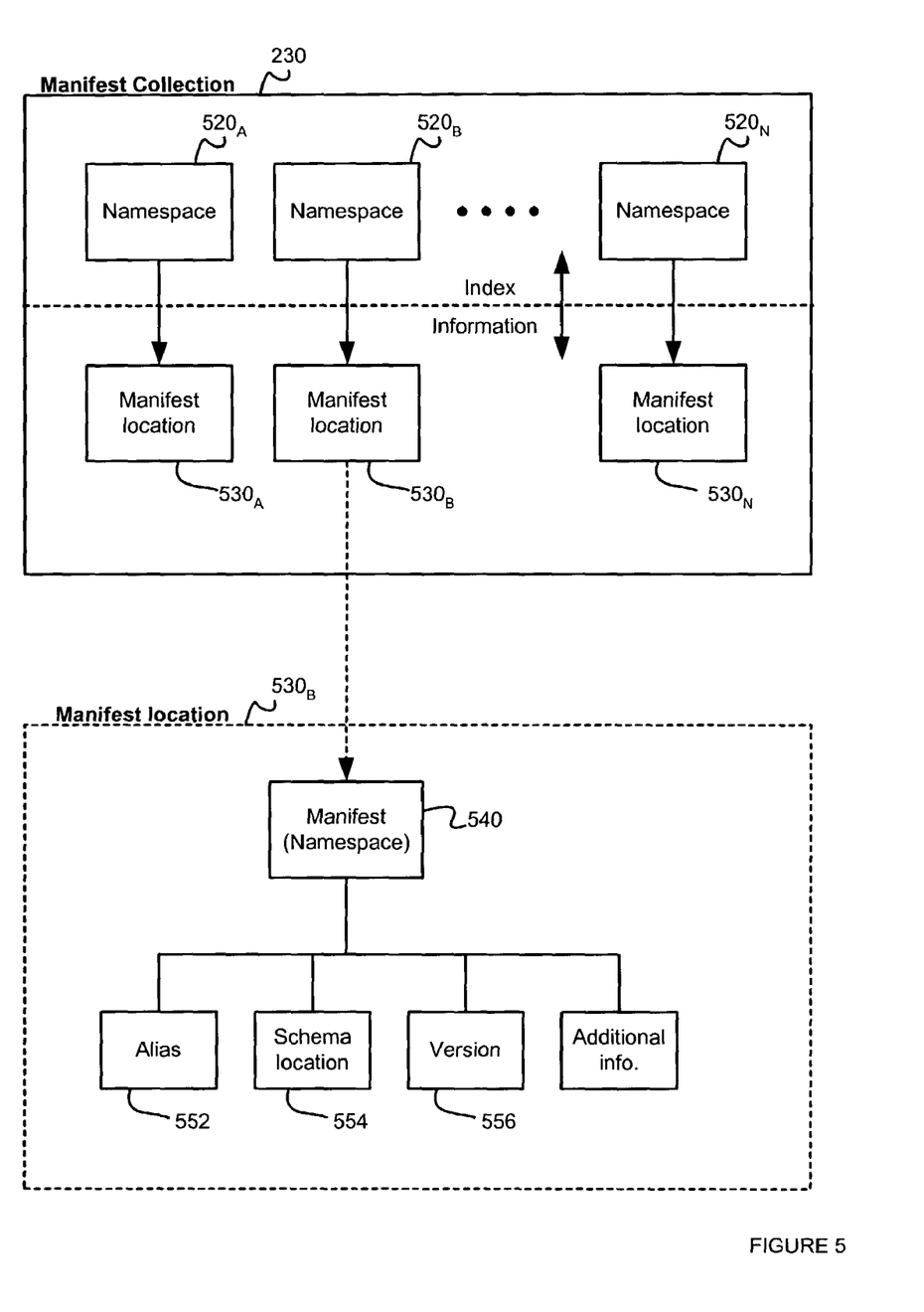
FIG. 5 is a schematic diagram of a manifest collection.

FIG. 5 is a schematic diagram of a manifest collection 230. As illustrated in the figure, manifest collection 230 is organized on two separated levels: the index level and the information level. The index level contains a plurality of namespaces $520_{A-N}$. The information level contains manifest information indexed to namespaces $520_{A-N}$. As illustrated in the figure, manifest information includes manifest location $530_{A-N}$, which are the locations of the manifests associated with namespaces $520_{A-N}$. However, the manifest information may include other information, such as version information, aliases, file type, and the like.

As an example, the figure illustrates the actual schema manifest 540 at manifest location $530_B$. Manifest 540 contains information related to namespace $530_B$ as well as other information. Alias 552 is a friendly name for namespace $520_B$ or the primary schema associated with manifest 540. Schema location 554 is the location where the primary schema is found. Typically, schema location 554 indicates a persistent location. Version 556 is the version of schema manifest 540.

Figure 6:
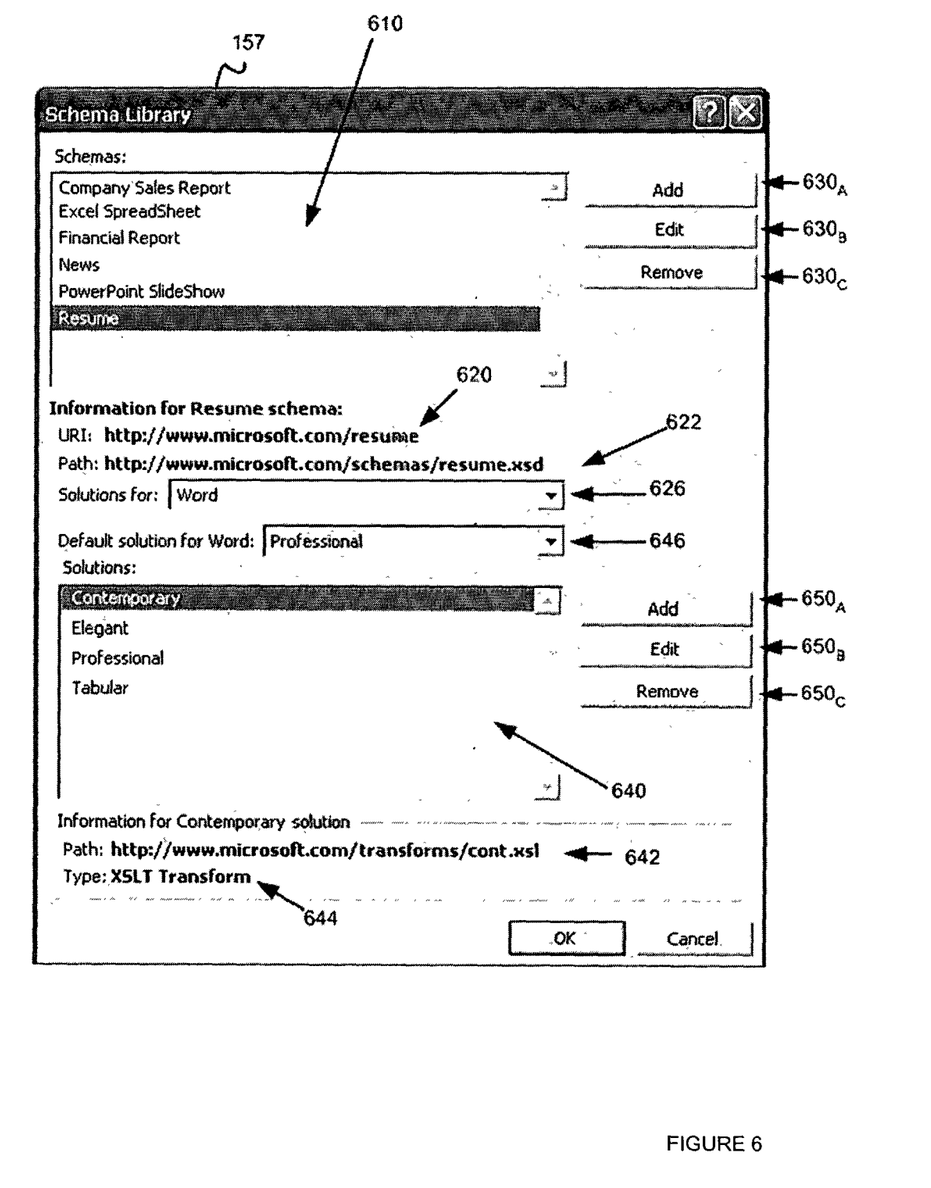
FIG. 6 is a screenshot of an exemplary user interface for managing a schema library.

FIG. 6 is a screenshot of an exemplary user interface 157 for managing a namespace library. User interface 157 allows a user of the namespace library to view and manipulate namespace related information.

Schema display field 610 displays namespaces and the names of XML schemas associated with the namespace library. As illustrated in the figure, the aliases of the namespaces and the schemas are displayed to enhance user-friendliness. The "Resume" namespace is highlighted. Namespace display field 620 shows the URI of the namespace associated with the "Resume" namespace. Schema location field 622 shows the location of the "Resume" schema. The location shown in this exemplary user-interface shows a persistent storage location at a remote internet address within the "microsoft.com" domain. Namespace command buttons $630_{A-C}$ allow the user to issue commands to the namespace library for adding, editing or removing namespaces.

Solution display field 640 displays solutions associated with a particular namespace in the namespace library. Somewhat similar to schema display field 610, solution display field 640 displays aliases of solutions to enhance the user experience. These solutions are specific to a particular application program, which is identified and selected at an application program identifier field 626. As shown in the figure, the solutions are specific to the "WORD" application program. Four different solutions are available for the "Resume" namespace and "WORD." The "Contemporary" solution is highlighted. Solution location field 642 shows that the persistent storage location of the "contemporary" schema is at a remote internet address at the "microsoft.com" domain. The type of the "Contemporary" solution is shown in solution type field 644 as an XSLT. Default solution field 646 allows a user to select a default solution for the "WORD" application. Solution command buttons $650_{A-C}$ allow the user to issue commands to the namespace library for adding, editing or removing solutions.

Figure 7:
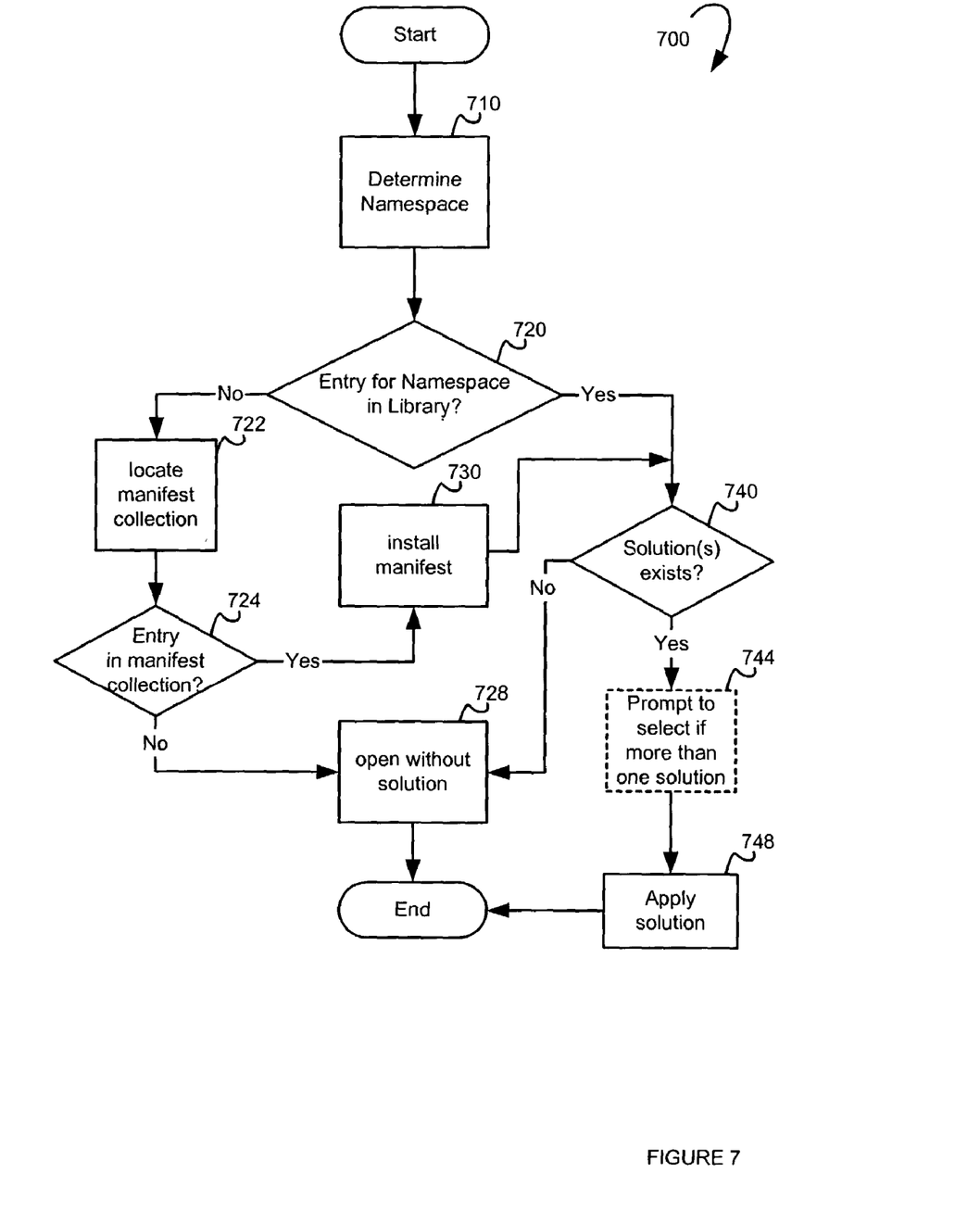
FIG. 7 is an operational flow diagram generally illustrating a process that may be used by an application program to obtain namespace related information.

FIG. 7 is an operational flow diagram generally illustrating a process 700 that may be used by an application program to obtain namespace related information for opening an XML document. Process 700 begins when the application program is opening an XML document. Moving from a start block, at block 710, the application program determines namespaces for querying a namespace library. For example, the XML document may include a tag that references a schema by a URI. Several namespaces may be determined from one XML document. For the purpose of illustration, process 700 is shown with one determined namespace.

At decision block 720, a determination is made whether an entry for the namespace exists in the namespace library. If so, process 700 moves to decision block 740, described later. If not, the process moves to block 722 where a manifest collection identified in the namespace library is located. Then, the process goes to decision block 724 where a determination is made whether an entry for the namespace exists in the manifest collection. If an entry exists in the manifest collection, process 700 goes to block 730 where the manifest is installed. The process then continues at block 740. Otherwise, process 700 moves to block 728 where the XML document is opened without a solution in the namespace library. It is to be understood that the application program may apply its own solution (such as a universal transform) to open the XML document. Then, the process ends.

Returning to decision block 740, a determination is made whether at least one solution exists in the namespace library associated with the entry for the namespace and the application program. If so, process 700 moves to optional block 744 (indicated by the dash lines) where if more than one solution exists, the user is prompted to select one of the solutions. Also, one of the solutions may be designated as a default solution, which may be applied automatically. The process then continues at block 748 where the selected solution is applied by the application program for opening the XML document. It is to be understood that the application program may be required to install a solution manifest. The XML document is then opened with the solution and the process ends.

Returning again to block 740, if a solution for the namespace and the application program does not exist, the process continues at block 728 where the XML document is opened without a solution in the namespace library and process 700 ends.

The above specification, examples and data provide a complete description of the invention. Since many embodiments of the invention can be made without departing from the spirit and scope of the invention, the invention resides in the claims hereinafter appended.

What is claim is:

1. A computer-readable storage medium encoded with computer-executable components, comprising:
   a namespace library configured to provide namespace related information to the computer-executable components on a computer, wherein the namespace related information is indexed by a plurality of namespaces, and wherein the namespace related information includes information that describes how an XML document is to be handled; and
   an application program configured to open the XML document, wherein:
   the XML document refers to at least one of the namespaces,
   the application program is further configured to query the namespace library to identify namespace related information associated with the namespace,
   the namespace related information is retrieved from the namespace library when an entry for the namespace exists in the namespace library,
   the namespace related information is retrieved from a manifest collection that is identified in the namespace library when an entry for the namespace does not exist in the namespace library and when an entry for the namespace exists in the manifest collection,
   the application program uses the namespace related information to open the XML document when namespace related information exists in the namespace library or the manifest collection,
   the application program applies a universal solution associated with the application program to open the XML document when an entry for the namespace does not exist in the namespace library and the manifest collection; and
   the application program opens the XML document without the namespace related information when an entry for the namespace does not exist in the namespace library and the manifest collection and no universal solution is associated with the application program.

2. The computer-readable medium of claim 1, wherein the namespace related information includes at least one location identifier for a primary XML schema associated with the namespace.

3. The computer-readable medium of claim 1, wherein the namespace related information includes at least one location identifier for a solution associated with the namespace and one of a plurality of application programs.

4. The computer-readable medium of claim 3, wherein the location identifier indicates a location on a local storage unit where the solution associated with the namespace is stored.

5. The computer-readable medium of claim 3, wherein the solution associated with the namespace is contained in a repository on another computer, and wherein the location of the solution in the repository is indicated by the location identifier.

6. The computer-readable medium of claim 5, wherein the application program associated with the solution associated with the namespace is configured to interact with the repository in the other computer through a network, and wherein the application program retrieves the solution associated with the namespace from the repository using the location identifier.

7. The computer-readable medium of claim 3, wherein the solution associated with the namespace includes an XML schema.

8. The computer-readable medium of claim 3, wherein the namespace related information further includes at least one property associated with the solution associated with the namespace.

9. The computer-readable medium of claim 1, wherein the namespace related information includes a location identifier for at least one manifest collection.

10. The computer-readable medium of claim 9, wherein the namespace related information further includes at least one property associated with the manifest collection.

11. The computer-readable medium of claim 1, wherein the namespace related information includes a location identifier of at least one default solution associated with the namespace and the application programs.

12. The computer-readable medium of claim 1, wherein the namespace related information includes a list of elements associated with the namespace.

13. The computer-readable medium of claim 12, wherein the namespace related information further includes at least one feature associated with one of the listed elements.

14. A method for obtaining information to handle an XML document containing a namespace, comprising:
   querying a namespace library using the namespace;
   when the namespace library contains an entry for the namespace, retrieving namespace related information associated with the namespace;
   when the namespace library does not include an entry for the namespace and when an entry for the namespace exists in a manifest collection, retrieving the namespace related information from the manifest collection that is identified in the namespace library, wherein the namespace related information includes information that describes how the XML document is to be handled;
   using the namespace related information to handle the XML document when namespace related information exists in the namespace library or the manifest collection;

if the namespace library does not contain at least one entry for the namespace in the namespace library and manifest collection, applying a universal solution associated with an application program to open the XML document; and opening the XML document without the namespace related information when an entry for the namespace does not exist in the namespace library and the manifest collection and no universal solution is associated with the application program.

15. The method of claim 14, further comprising if the namespace library contains a location identifier for a solution associated with the namespace, retrieving the solution using the location identifier and applying the solution to open the XML document.

16. The method of claim 14, further comprising if the namespace library contains at least two location identifiers associated with two solutions associated with the namespace, prompting a user to select one of the solutions, retrieving the solution using the location identifier, and applying the selected solution to open the XML document.

17. The method of claim 14, further comprising installing the manifest collection.

* * * * *